US006820033B1

(12) United States Patent
Hapgood et al.

(10) Patent No.: US 6,820,033 B1
(45) Date of Patent: Nov. 16, 2004

(54) METHOD AND APPARATUS FOR ESTIMATING THE WEIGHT OF HORSES

(75) Inventors: Alyssa M. Hapgood, 1209 Colchester Terr., Edmond, OK (US) 73034; Joseph P. Hapgood, Edmond, OK (US); Robert D. Curley, Norman, OK (US)

(73) Assignee: Alyssa M. Hapgood, Edmond, OK (US)

( * ) Notice: Subject to any disclaimer, the term of this patent is extended or adjusted under 35 U.S.C. 154(b) by 167 days.

(21) Appl. No.: 09/865,948

(22) Filed: May 25, 2001

(51) Int. Cl.$^7$ .............................................. G01G 11/00

(52) U.S. Cl. ...................... 702/173; 702/127; 702/128; 702/129; 33/511; 33/755; 33/759; 119/842; 119/14.02; 119/14.08; 452/150; 452/157; 177/1

(58) Field of Search ................................ 702/173, 129, 702/127, 128; 33/511, 755, 759; 119/842, 14.02, 14.08; 452/150, 157; 177/1

(56) References Cited

U.S. PATENT DOCUMENTS

| | | | | |
|---|---|---|---|---|
| 4,688,653 A | * | 8/1987 | Ruble ............................. | 177/1 |
| 4,745,472 A | * | 5/1988 | Hayes .......................... | 348/141 |
| 4,823,894 A | * | 4/1989 | Koerner .................... | 177/25.14 |
| 6,314,654 B1 | * | 11/2001 | Morissette .................... | 33/511 |
| 2002/0046471 A1 | * | 4/2002 | Skidmore .................... | 33/511 |

FOREIGN PATENT DOCUMENTS

| | | | | |
|---|---|---|---|---|
| EP | 1316776 A2 | * | 6/2003 | ............ G01B/5/00 |
| JP | 2002262714 A | * | 9/2002 | .......... A01K/67/00 |

OTHER PUBLICATIONS

Eric W. Weisstein's world of mathematics at http://mathworld.wolfram.com/.*

Derwent–Acc_No 2000–617400 Derwent–Week 200059 Inventor: Van De Crommert, A J A M Application–Data: Pub–No: Nl 101104 Appl–No: 1999Nl–1011049 Appl–Date: Jan. 15, 1999.*

"Tutorial Article: Measuring and estimating the weight of horses with tapes, formulae and by visual assessment"; D.G. Reavell; Equine Veterinary Education; Dec./1999.

"Accuracy of different methods of estimating the weight of horses"; J.M. Ellis, T. Hollands; The Veterinary Record, Sep. 19, 1998; pp. 335–336.

"Field Method for Determining the Weight of a Foal";R.L. Asquith, DVM et al.; Association of Equine Practitioners;38th Annual Convention Proceedings, 1992;p.469.

"Erroneous Weight Estimation of Horses"; R.L. Asquith, DVM, E.L. Johnson, PhD., J. Kivipetto, MS; and C. Depew Ph.D; pp. 599–607.

"Determining a Foal's Weight"; Frederick Harper, PhD, Extension Horse Specialist, University of Tennessee; The Equine Athlete, vol. 9, No. 3, May/Jun. 1996; p. 27.

(List continued on next page.)

Primary Examiner—John Barlow
Assistant Examiner—Anthony Dougherty
(74) Attorney, Agent, or Firm—Dunlap, Codding & Rogers, P.C.

(57) ABSTRACT

A method and an apparatus for estimating the weight of horses. To estimate the weight of a horse, a girth, a length, and a height of the horse are measured. The measurements can be taken with commercially available measurement tapes, for example. The weight of the horse is then estimated based on the girth, the length and the height of the horse. The present invention will be utilized in the care and management of horses thereby resulting in advanced equine health and nutrition, better training results, and improved overall health monitoring.

16 Claims, 2 Drawing Sheets

OTHER PUBLICATIONS

"Accuracy of prediction of the live weight of horses from body measurements"; R.S. Jones, et al.; Veternary Record Nov. 25, 1989; pp. 549–553.

"Body condition scoring and weight estimation of horses"; C. L. Carroll and P.J. Huntington; Equine Veterinary Journal, Equine vet.J. (1998) (1) ; pp. 41–45.

"Weighing Horses"; Harold F. Hintz, Ph.D; Equine Practice; Sep. 1988, vol. 10, No. 8.

"Weight of Horses: Improved Estimates Based on Girth and Length"; Jean Milner and D. Hewitt; Can. Vet Journal, vol. 10, No. 12, Dec. 1969; pp. 314–316.

"Storey's Guide to Raising Horses"; Heather Smith Thomas; Copyright 2000; p. 295.

"Horses and Horsemanship"; Ensminger; Seventh Edition, Copyright 1999 by Interstate Publishers; p. 221–222, 598.

"Horse Owner's Veterinary Handbook"; Second Edition, Copyright 1989; James M. Giffin, M.D. and Tom Gore, DVM; pp. 458–460.

"Feeding and Care of the Horse"; Lon D. Lewis; Copyright 1996; pp. 118–121 and p. 266.

"The Complete Horse Care Manual–The Essential Practical Guide to All Aspects of Caring For Your Horse"; Colin Vogel, B.V.M.; Copyright 1995; p. 107.

"Horse Nutrition, A Practical Guide"; Harold F. Hintz, Ph.D.; Copyright 1983; Published 1988; p. 34,184,186, and 188.

* cited by examiner

METHOD AND APPARATUS FOR ESTIMATING THE WEIGHT OF HORSES

CROSS-REFERENCE TO RELATED APPLICATIONS

Not Applicable.

STATEMENT REGARDING FEDERALLY SPONSORED RESEARCH AND DEVELOPMENT

Not Applicable.

BACKGROUND OF THE INVENTION

There are many instances where determining an accurate weight of a horse is desirable, if not essential for proper medication, feeding, training and health monitoring requirements. Equine scales for weighing horses are available. Equine scales are large pieces of machinery which are typically expensive and unaccessible. For example, in many situations veterinary care must be administered in the field as opposed to a clinical setting. While the veterinarian may have an equine scale at her place of business, such scale may not be accessible when the veterinarian is working in the field.

For these reasons, methods have been developed for estimating the weight of the horse. One such method has been visual weight estimation, based only upon observation of the horse. This method has proven to be the least reliable and typically results in substantial estimation errors. Usually, such estimation errors result in a significant under estimation of weight.

Another method utilizes the girth measurement of a horse to estimate a weight. The practical application of this method involves the use of a girth weight tape which is stretched around the heart girth of a horse. Printed on the girth weight tape are weight estimates corresponding to the girth measurement. Where the tape overlaps after being wrapped around the girth, the indicated weight is read from the tape. The girth measurement calculation method is more accurate than the visual estimation method in predicting a horse's weight.

Yet another method utilizes both girth and length measurements of a horse to estimate a weight. The girth and length measurement method is more accurate than either the visual estimation method or the girth measurement calculation method. Although the girth and length measurement method is more accurate than either the visual weight estimation or the girth measurement method, substantial estimation errors are still made.

In light of the foregoing, the need exists for a more accurate weight estimation method which can be utilized in the care and management of horses thereby resulting in advanced equine health and nutrition, better training results and improved overall health monitoring. It is to such an improved method of estimating the weight of a horse that the present invention is directed.

SUMMARY OF THE INVENTION

The present invention relates to a method and apparatus for estimating the weight of horses. It is envisioned that the present invention will be utilized in the care and management of horses thereby resulting in advanced equine health and nutrition, better training results, and improved overall health monitoring.

Broadly, to estimate the weight of a horse, a girth, a length, and a height of the horse is measured. The measurement can be taken with commercially available measurement tapes, for example. The weight of the horse is then estimated based on the girth, the length and the height of the horse.

Utilizing the present invention, a more accurate estimate of the horse's weight has been made. For example, in one embodiment, weight estimates produced in accordance with the present invention produced an adjusted $R^2$ of 0.097559 compared to an adjusted $R^2$ of 0.095349 for the next most accurate prior art model, i.e., the girth and length measurement method discussed above. By using the present invention, the general health and welfare of horses can be improved significantly by eliminating under dosing or over dosing of medication, preventing improper nutritional decisions and enhancing training regimens while improving the overall health monitoring of horses.

In one aspect of the present invention, an apparatus for estimating the weight of a horse is provided. The apparatus includes an input unit, a storage unit, a computer unit, and an output unit. The input unit is adapted to receive a measured height, a measured girth, and a measured length of the horse. The storage unit stores weight estimation logic adapted to estimate the weight of the horse based on the measured height, the measured girth and the measured length of the horse. The computer unit receives the measured height, the measured girth and the measured length of the horse and executes the weight estimation logic to estimate the weight of the horse. The output unit outputs a signal indicative of the weight of the horse in a format perceivable by an individual.

The apparatus can be in the form of a handheld calculator, a desk top computer, or a laptop computer, for example.

In yet another aspect of the present invention, a software program capable of running on a computer for estimating the weight of a horse is provided. The software program can be stored on a storage unit, such as a hard disk, a CDROM, a memory or the like. The software program is provided with input logic, weight estimation logic, and output logic. The interface logic is adapted to receive a measured height, a measured girth, and a measured length of the horse. The weight estimation logic estimates the weight of the horse based on the measured height, the measured girth and the measured length of the horse. The output logic generates an estimated weight indicative of the weight of the horse. In one preferred embodiment of the present invention, the input logic and the output logic are implemented as a computer screen populated with appropriate fields to permit the measured height, the measured girth, the measured length, and the estimated weight to be entered and displayed.

Thus, it will be understood by those skilled in the art that the present invention provides more accurate weight estimates than methods currently available so that more accurate medication dosages, feed and nutrition considerations, training and racing performance and health monitoring requirements can be provided.

DETAILED DESCRIPTION OF THE INVENTION

Figure 1:
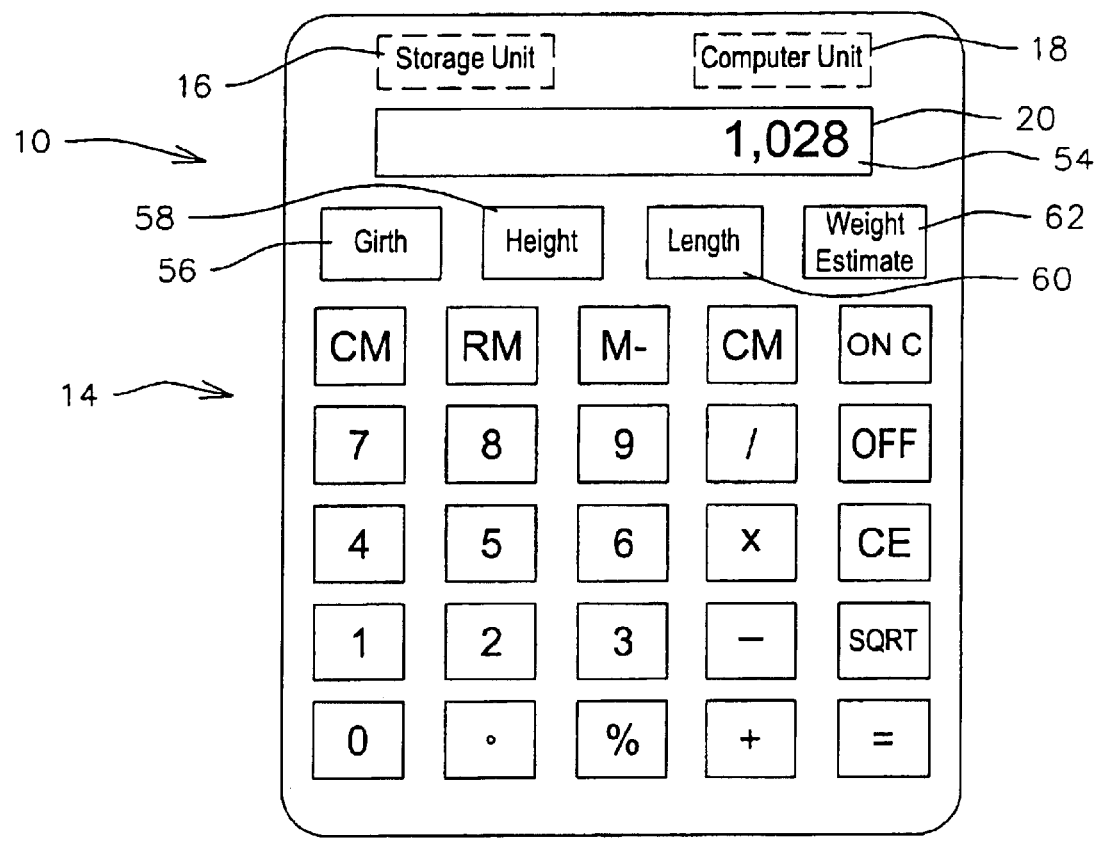
FIG. 1 is a top plan view of an apparatus, constructed in accordance with the present invention, for estimating the weight of a horse.
Figure 2:
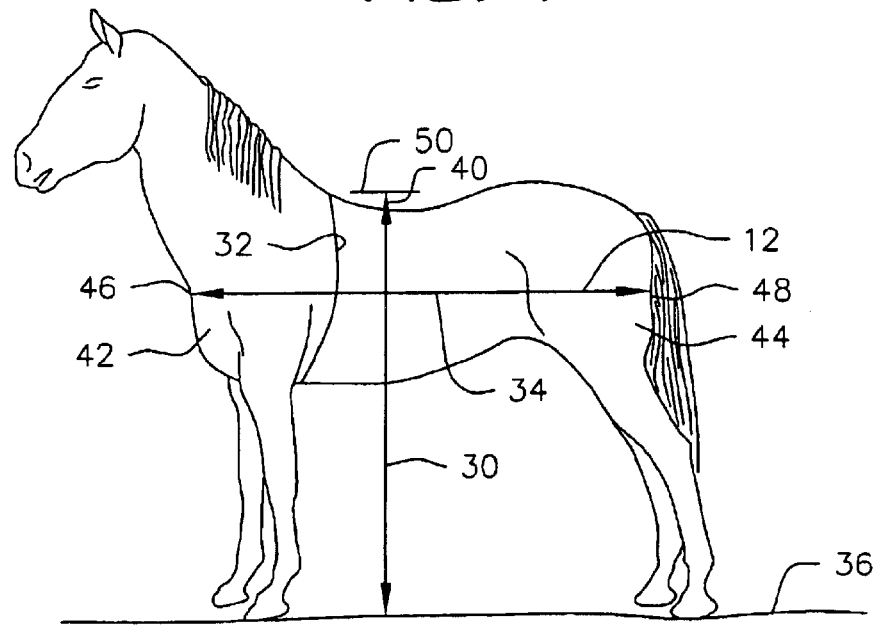
FIG. 2 is a side elevational view of a horse illustrating measurements of such horse being taken in accordance with the present invention.

Referring now to the drawings, in particular to FIG. 1, shown therein and designated by the referenced numeral 10 is an apparatus, constructed in accordance with the present invention, for estimating the weight of a horse 12 (FIG. 2). In general, the apparatus 10 is provided with an input unit 14, a storage unit 16, a computer unit 18, and an output unit 20.

As best shown in FIG. 2, the horse 12 is standing on the ground 36. As will be well understood by those skilled in the art, the horse 12 is provided with withers 40, a shoulder 42 and a buttocks 44. The shoulder 42 has a point 46, and the buttocks 44 has a point 48. The point 46 is typically at the outermost portion of the shoulder 42. Likewise, the point 48 is an outermost portion of the buttocks 44.

The measured height 30 is obtained by measuring the distance from the ground 36 to a top 50 of the withers 40 of the horse 12. The measured girth 32 can be obtained by measuring about the heart girth 32 with a measuring tape snug against the horse 12 following respiratory expiration. For example, the measured girth 32 can be taken using a commercially available measuring tape.

The measured length 34 of the horse 12 can be obtained by measuring the distance from the point 46 of the shoulder 42 to the point 48 of the buttocks 44 in a straight line. In other words, the measured length equals the distance from the tuber ischium to the point 46 of the shoulder 42. Once the measured height 30, measured girth 32 and the measured length 34 of the horse 12 are determined, the input unit 14 is utilized to enter the measured height 30, the measured girth 32 and the measured length 34 into the apparatus 10. For example, as shown in FIG. 1, the input unit 14 can be a keyboard. However, it should be understood that the input unit 14 can be any type of input unit capable of entering in the measured height 30, measured girth 32 and the measured length 34 into the apparatus 10. For example, the input unit 14 can be a microphone and the measured height 30, measured girth 32, and the measured length 34 can be spoken into the microphone.

The storage unit 16 stores weight estimation logic adapted to determine an estimated weight of the horse 12 based on the measured height 30, the measured girth 32 and the measured length 34 of the horse 12. The storage unit 16 can be any type of medium which can be read by the computer unit 18. For example, the storage unit can be an optical storage unit, a magnetic storage unit, or any other type of suitable storage unit such as an EEPROM, a ROM, or the like. The weight estimation logic will be discussed in more detail below.

The computer unit 18 receives the measured height 30, the measured girth 32 and the measured length 34 of the horse 12 and executes the weight estimation logic so as to estimate the weight of the horse 12 based on the measured height 30, the measured girth 32 and the measured length 34. The computer unit 18 can be any type of computer capable of receiving the measured height 30, the measured girth 32 and the measured length 34 of the horse 12 and executing the weight estimation logic so as to estimate the weight of the horse 12. For example, the computer unit 18 can be a central processing unit, a digital signal processor or a logic control unit, each of which is well known in the relevant art. Thus, no further comments are deemed necessary to one skilled in the art how to make or use the computer unit 18.

The output unit 20 outputs an estimated weight 54 indicative of the estimated weight of the horse 12 in a format perceivable by an individual. For example, the output unit 20 can output the estimated weight 54 in an audio format, a video format, or a combination thereof. As shown in FIG. 1, the estimated weight 54 can be provided as alphanumeric characters displayed on a display device, such as a LCD screen.

In a preferred embodiment shown in FIG. 1, the input unit 14 is provided with a girth button 56, a height button 58 and a length button 60. To estimate the weight of the horse 12 utilizing the apparatus 10, an individual determines the measured height 30 as discussed above, and then enters the measured height 30 via the input unit 14 into the apparatus 10. The individual then punches the height button 58. The individual then determines the measured girth 32 as discussed above, and enters such measured girth 32 into the apparatus 10 via the interface unit 14. The individual then punches the girth button 56 to store the measured girth 32 in the storage unit 16. The individual then determines the measured length 34 as discussed above, and then enters the measured length 34 into the apparatus 10 utilizing the interface unit 14. The individual then punches the length button 60 to store the measured length 34 in the storage unit 16. The individual then punches a weight estimation button 62 to cause the computer unit 18 to execute the weight estimation logic stored in the storage unit 16 to determine the estimated weight 54 of the horse 12. Once the weight estimation logic has executed, the estimated weight 54 is displayed or otherwise outputted in a format perceivable by the individual.

In the preferred embodiment shown in FIG. 1, the apparatus 10 is in the form of a handheld calculator. However, it should be understood that the apparatus 10 can be implemented in many other forms. For example, as will be discussed below, the apparatus 10 can be implemented as a desktop computer, a laptop computer, a palm computer or any other device, such as a cellular telephone, capable of executing the weight estimation logic as discussed herein.

Figure 3:
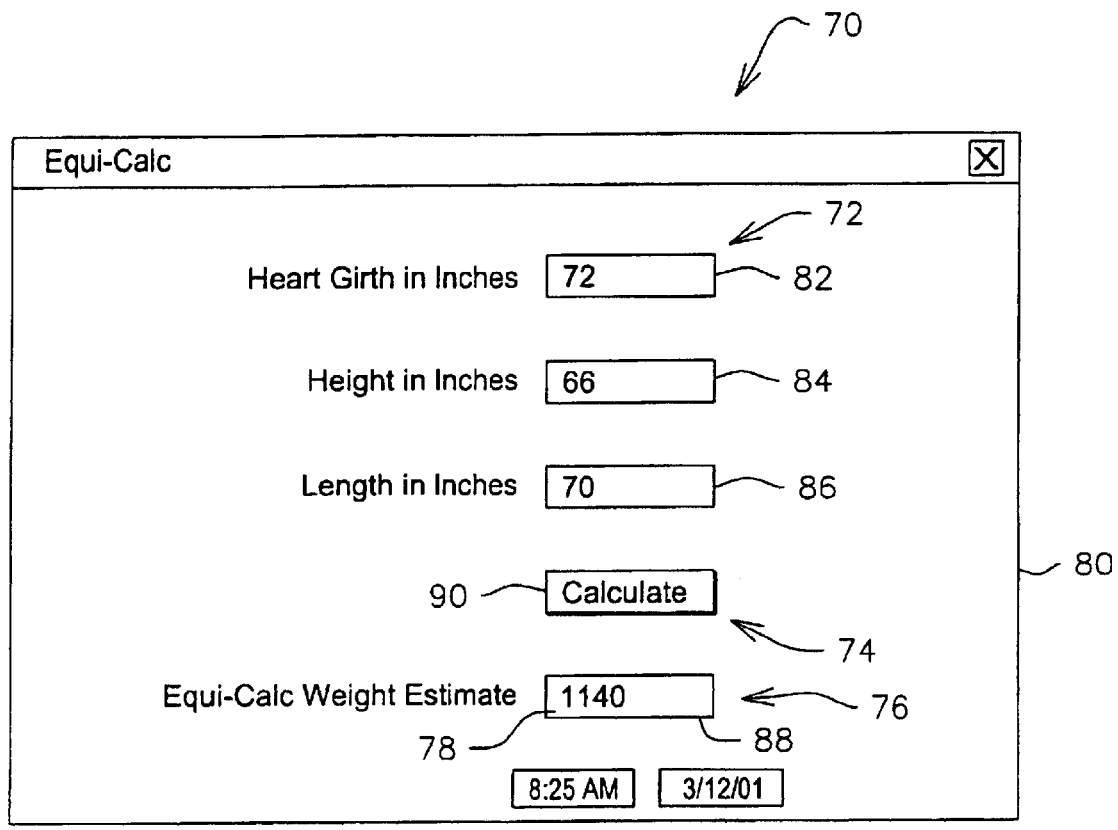
FIG. 3 is a diagrammatic view of a software program, constructed in accordance with the present invention, for estimating the weight of a horse.

Referring now to FIG. 3, shown therein and designated by a reference numeral 70, is a software program, constructed in accordance with the present invention, for determining the estimated weight of the horse 12. The software program 70 is adapted to be run on a computer, such as a desktop computer, a laptop computer, a notebook computer, a mainframe computer, a personal data assistant (PDA), a cellular telephone, a pre-programmed calculator or a user programmable calculator. In general, the software program 70 is provided with input logic 72, weight estimation logic 74 and output logic 76. The software program 70 is stored on any suitable type of storage unit. The storage unit for storing the software program 70 can be any device capable of storing data in a format readable by a computer. For example, the storage unit can be an optical disk suitable for reading by an optical drive, a magnetic disk (hard or floppy) suitable for reading a magnetic drive, a memory unit (RAM or ROM) or the like.

The software program 70 can be run on any suitable type of computer, such as a hand held calculator, a desktop computer, a laptop computer, a palm computer or any other device, such as a cellular telephone or a personal data assistant, capable of executing the weight estimation logic 74 as discussed herein. The software program 70 can be run on a remote computer, such as a website. In this case, the input logic 72 and the output logic 76 could gather and output data from any device having a browser program, such as a personal computer, a cellular telephone or personal data assistant.

The input logic 72 is adapted to receive the measured height 30, the measured girth 32, and the measured length 34 of the horse 12. The weight estimation logic 74 determines an estimated weight 78 of the horse 12 based on the measured height 30, the measured girth 32 and the measured length 34 of the horse 12. The output logic 76 outputs the estimated weight 78.

In a preferred embodiment of the software program 70, the input logic 72, and the output logic 76 are implemented as a computer screen 80 populated with a plurality of fields 82, 84, 86, and 88 so as to permit the measured height 30, measured girth 32, the measured length 34, and the estimated weight 78 to be entered and displayed.

More specifically, the field 82 receives the measured girth 32. The field 84 receives the measured height 30. The field 86 receives the measured length 34. The estimated weight 78 is displayed in the field 88.

The weight estimation logic 74 can be linked to the computer screen 80 via any suitable logic, such as a weight estimation button 90 disposed on the computer screen 80.

To determine the estimated weight of the horse 12 utilizing the software program 70, an individual determines the measured height 30 as discussed above, and then enters the measured height 30 into the field 84. The individual then determines the measured girth 32 as discussed above, and enters such measured girth into the field 82. The individual then determines the measured length 34 as discussed above, and then enters the measured length 34 into the field 86. The individual then clicks on or otherwise actuates the weight estimation button 90 to cause the software program 70 to execute the weight estimation logic 74 to determine the estimated weight 78 of the horse 12. Once the weight estimation logic 74 has been executed, the estimated weight 78 is displayed or otherwise outputted in a format perceivable by the individual. For example, the estimated weight 78 could be provided in an audio format, a video format, a printed format or a combination thereof.

As will be well understood by those skilled in the art, once the estimated weight 78 is provided, an owner, a veterinarian or other care provider of the horse 12 can then use the estimated weight 78 to provide care for the horse 12. For example, the estimated weight 78 can be used to determine dosages of medications, such as anthelmintics (medications for parasites) or anesthesia. The estimated weight 78 can also be used to determine dosages of vitamins or nutrients for the horse 12.

The weight estimation logic 74 utilized by the software program 70 and the apparatus 14 will now be described in more detail. In general, the weight estimation logic 74 was determined by taking measurements (i.e., the measured height 30, the measured girth 32, and the measured length 34) of a plurality of horses so as to develop a data base including the girth, height and length of a variety of horses. Through regression analysis, and using the variables girth, height and length, the following formula was developed by using the natural logarithm of actual weight as the dependent variable, and the natural logarithms of girth, height and length as independent variables in the following linear regression equation:

$$\text{Weight Estimate} = k1 \times \text{Girth}^{x1} \times \text{Height}^{x2} \times \text{Length}^{x3}$$

where k1 is a constant, and x1, x2 and x3 are exponents. In one preferred embodiment, k1 is about 0.003591, x1 is about 1.638339, x2 is about 0.948065 and x3 is about 0.397592.

The foregoing formula produces weight estimates to an accuracy having an adjusted $R^2$ of about 0.97559. It should be noted that the units used in each of the examples set forth herein for girth 32, height 30 and length 34 are in inches. However, it should be understood that other units of measurement could also be used so long as the units of measurement are used consistently. The regression analysis can be performed by any type of analysis for fitting curves to a plurality of data points, such as multiple regression methods, linear regression methods, forward stepwise regression methods, and backward stepwise regression methods.

A second model was produced using similar methods as discussed above to estimate the weight of the horse 12 using the measured height 30, measured girth 32 and the measured length 34. The second model is based on the following mathematical formula:

$$\text{Estimated Weight} = k2 \times (\text{Girth} \times f1 + \text{Height} \times f2 \times \text{Length} \times f3)^{x4}$$

where k2 is a constant, f1, f2, f3 are factors, and x4 is an exponent.

When the units used to determine the measured height 30, measured girth 32 and the measured length 34 are inches, k2 can be about 0.003633, f1 can be about 0.056, f2 can be about 0.031, f3 can be about 0.13, and x4 can be about 0.2978070.

Two additional models were produced using similar methods as discussed above to estimate the weight of the horse 12 using the measured girth 32 and the measured height 30. The third model can be based on the following mathematical formula:

$$\text{Estimated Weight} = K3 \times \text{Girth}^{x5} \times \text{Height}^{x6}$$

where K3 is a constant and x5 and x6 are exponents.

When the units used to determine the measured height 30, measured girth 32 and the measured length 34 are inches, k3 can be about 0.003538, x5 can be about 1.989527, and x6 can be about 1.004088. The third model produced weight estimates to an accuracy having an adjusted $R^2$ of about 0.97003.

The fourth model can be based on the following mathematical formula:

$$\text{Estimated Weight} = K4 \times (\text{Girth} \times f4 + \text{Height} \times f5)^{x7}$$

where K4 is a constant, f4 and f5 are factors, and x7 is an exponent.

When the units used to determine the measured height 30, measured girth 32 and the measured length 34 are inches, k4 can be about 0.003479, f4 can be about 0.63, f5 can be about 0.37 and x7 can be about 2.999198. The fourth model produced weight estimates to an accuracy having an adjusted $R^2$ of about 0.97076. It should be understood that the foregoing values set forth in the formulas discussed above, are only examples of suitable constants, factors and exponents. Also, it should be understood that mathematical techniques other than regression analysis could be utilized to produced similar formulas or results. For example, numerical methods for fitting curves or lines to data, such as splines, polynomials, or factorials could be used. As more horses are measured, weighed and added to the data base, it is believed that such constants may be refined so as to give a more accurate estimate of the weight of the horse 12. The term "about" as used in the claims is intended to cover all such refinements to the constants, factors and exponents so long as the models forming the weight estimation logic determine the estimated weight, as set forth herein.

Furthermore, it should be understood that the 224 horses provided in the data base were not placed in categories before determining the constants provided in the foregoing models. It is believed that the foregoing models can be made more accurate by categorizing the horses into predetermined different classes before utilizing the multiple regression analysis. For example, the horses could be categorized into specific groupings, such as miniature horses, ponies, light horses, draft horses, or even wild horses and feral horses, horses in show condition and those that are not, each of which is a category of horses well known in the art. By categorizing the horses in the data base into different specific groupings, it is believed that the constants, factors and exponents discussed herein would be refined to provide a more accurate estimated weight of the horses 12 in each category.

The apparatus 14 and the software program 70 can include a button, field or other suitable input device to permit selection of a predetermined class before the estimated weight of the horse 12 is determined.

Examples used for determining each of the models are set forth below. It should be understood that the examples set forth herein are illustrative and not limitative.

Equine Weight Estimation Research Database

| ID | ESTWT | BREED | GENDER | ACTWT | LENGTH | GIRTH | HEIGHT | AGE |
|---|---|---|---|---|---|---|---|---|
| 1 | 1200 | 2 | 1 | 1140 | 64 | 76 | 68 | 9.0 |
| 2 | 900 | 2 | 1 | 1125 | 67 | 72 | 61 | 6.0 |
| 3 | 1100 | 2 | 1 | 1150 | 67 | 73 | 63 | 14.0 |
| 4 | 1100 | 2 | 1 | 1325 | 71 | 78 | 66 | 6.0 |
| 5 | 1200 | 2 | 1 | 1225 | 69 | 75 | 63 | 12.0 |
| 6 | 1200 | 2 | 1 | 1285 | 74 | 76 | 64 | 17.0 |
| 7 | 1200 | 2 | 1 | 1380 | 74 | 78 | 65 | 7.0 |
| 8 | 1100 | 2 | 2 | 1020 | 71 | 75 | 60 | 2.0 |
| 9 | 1050 | 2 | 2 | 1025 | 67 | 71 | 61 | 2.0 |
| 10 | 950 | 2 | 1 | 965 | 70 | 66 | 60 | 1.3 |
| 11 | 900 | 2 | 1 | 875 | 61 | 66 | 58 | 1.3 |
| 12 | 925 | 2 | 1 | 920 | 65 | 68 | 60 | 1.3 |
| 13 | 950 | 2 | 4 | 1040 | 68 | 71 | 62 | 1.3 |
| 14 | 900 | 2 | 4 | 925 | 63 | 68 | 59 | 1.3 |
| 15 | 975 | 2 | 1 | 1065 | 67 | 71 | 63 | 1.3 |
| 16 | 950 | 2 | 1 | 1002 | 66 | 69 | 61 | 1.3 |
| 17 | 900 | 2 | 4 | 870 | 64 | 67 | 58 | 1.3 |
| 18 | 925 | 2 | 4 | 960 | 68 | 69 | 59 | 1.3 |
| 19 | 975 | 2 | 1 | 1005 | 67 | 69 | 61 | 1.5 |
| 20 | 850 | 2 | 4 | 585 | 55 | 57 | 53 | 0.5 |
| 21 | 500 | 2 | 3 | 470 | 53 | 51 | 50 | 0.5 |
| 22 | 525 | 2 | 3 | 615 | 56 | 60 | 52 | 0.5 |
| 23 | 590 | 2 | 3 | 555 | 56 | 55 | 53 | 0.5 |
| 24 | 500 | 2 | 4 | 465 | 51 | 52 | 48 | 0.5 |
| 25 | 450 | 2 | 4 | 485 | 51 | 53 | 50 | 0.5 |
| 26 | 1000 | 2 | 2 | 1010 | 70 | 73 | 60 | 20.0 |
| 27 | 800 | 2 | 1 | 774 | 58 | 65 | 52 | 4.0 |
| 28 | 1200 | 2 | 1 | 1295 | 70 | 77 | 66 | 5.0 |
| 29 | 1200 | 2 | 2 | 1265 | 76 | 75 | 64 | 3.0 |
| 30 | 1000 | 2 | 2 | 1070 | 63 | 72 | 60 | 2.0 |
| 31 | 1000 | 2 | 2 | 1165 | 69 | 71 | 62 | 3.0 |
| 32 | 1000 | 2 | 2 | 970 | 65 | 69 | 61 | 3.0 |
| 33 | 1000 | 2 | 2 | 968 | 60 | 70 | 59 | 2.0 |
| 34 | 1000 | 2 | 1 | 1195 | 69 | 73 | 63 | 4.0 |
| 35 | 1200 | 2 | 1 | 1140 | 66 | 73 | 63 | 3.0 |
| 36 | 1100 | 2 | 2 | 1165 | 73 | 76 | 62 | 6.0 |
| 37 | 1000 | 2 | 1 | 998 | 63 | 69 | 63 | 3.0 |
| 38 | 1000 | 2 | 2 | 1012 | 66 | 69 | 61 | 3.0 |
| 39 | 950 | 2 | 2 | 980 | 63 | 70 | 62 | 2.0 |
| 40 | 1100 | 2 | 1 | 1235 | 67 | 74 | 65 | 3.0 |
| 41 | 1100 | 2 | 2 | 1115 | 67 | 71 | 64 | 4.0 |
| 42 | 1200 | 2 | 1 | 1052 | 67 | 70 | 64 | 3.0 |
| 43 | 1200 | 2 | 1 | 1265 | 70 | 75 | 68 | 3.0 |
| 44 | 1100 | 2 | 1 | 1046 | 62 | 69 | 62 | 6.0 |
| 45 | 1200 | 2 | 1 | 1220 | 70 | 75 | 67 | 5.0 |
| 46 | 1000 | 2 | 2 | 1050 | 65 | 70 | 62 | 2.0 |
| 47 | 900 | 2 | 2 | 724 | 58 | 65 | 51 | 7.0 |
| 48 | 900 | 2 | 2 | 988 | 58 | 71 | 62 | 4.0 |
| 49 | 1100 | 2 | 1 | 1084 | 66 | 72 | 63 | 2.0 |
| 50 | 1000 | 2 | 1 | 996 | 65 | 69 | 63 | 2.0 |
| 51 | 700 | 2 | 1 | 684 | 56 | 60 | 56 | 1.0 |
| 52 | 700 | 2 | 5 | 694 | 60 | 61 | 56 | 1.0 |
| 53 | 950 | 2 | 2 | 998 | 64 | 69 | 62 | 2.0 |
| 54 | 900 | 2 | 2 | 1096 | 70 | 72 | 60 | 3.0 |
| 55 | 1000 | 2 | 1 | 974 | 63 | 69 | 63 | 2.0 |
| 56 | 1000 | 2 | 1 | 1072 | 64 | 70 | 63 | 2.0 |

-continued

Equine Weight Estimation Research Database

| ID | ESTWT | BREED | GENDER | ACTWT | LENGTH | GIRTH | HEIGHT | AGE |
|---|---|---|---|---|---|---|---|---|
| 57 | 1500 | 3 | 2 | 1690 | 80 | 84 | 66 | 2.0 |
| 58 | 1700 | 3 | 1 | 1865 | 80 | 86 | 72 | 4.0 |
| 59 | 125 | 1 | 2 | 135 | 35 | 36 | 28 | 1.0 |
| 60 | 130 | 1 | 4 | 151 | 40 | 39 | 32 | 0.4 |
| 61 | 160 | 1 | 1 | 215 | 47 | 42 | 36 | 2.0 |
| 62 | 150 | 1 | 5 | 191 | 41 | 42 | 35 | 11.0 |
| 63 | 190 | 1 | 2 | 207 | 44 | 42 | 35 | 2.0 |
| 64 | 185 | 1 | 5 | 211 | 43 | 43 | 35 | 1.0 |
| 65 | 200 | 1 | 1 | 232 | 45 | 46 | 38 | 4.0 |
| 66 | 325 | 2 | 4 | 413 | 57 | 49 | 51 | 0.4 |
| 67 | 600 | 2 | 5 | 410 | 57 | 51 | 52 | 0.4 |
| 68 | 950 | 2 | 2 | 1012 | 75 | 53 | 59 | 12.0 |
| 69 | 870 | 2 | 5 | 815 | 74 | 62 | 61 | 1.3 |
| 70 | 850 | 2 | 1 | 890 | 76 | 66 | 59 | 5.0 |
| 72 | 1000 | 2 | 1 | 998 | 77 | 67 | 63 | 2.0 |
| 73 | 975 | 2 | 1 | 967 | 77 | 68 | 63 | 2.0 |
| 74 | 950 | 2 | 2 | 986 | 74 | 68 | 63 | 3.0 |
| 75 | 1000 | 2 | 1 | 890 | 74 | 68 | 63 | 7.0 |
| 76 | 940 | 2 | 5 | 910 | 71 | 68 | 63 | 7.0 |
| 78 | 1150 | 2 | 1 | 1021 | 74 | 69 | 63 | 5.0 |
| 79 | 1000 | 2 | 1 | 935 | 76 | 69 | 64 | 9.0 |
| 80 | 977 | 2 | 1 | 980 | 75 | 69 | 63 | 5.0 |
| 81 | 1350 | 2 | 1 | 1309 | 84 | 76 | 64 | 10.0 |
| 82 | 1200 | 2 | 1 | 1192 | 79 | 76 | 65 | 7.0 |
| 83 | 1400 | 2 | 1 | 1375 | 82 | 76 | 67 | 13.0 |
| 84 | 1350 | 2 | 1 | 1305 | 81 | 76 | 67 | 6.0 |
| 85 | 1100 | 2 | 1 | 1060 | 76 | 70 | 60 | 1.0 |
| 86 | 1050 | 2 | 2 | 985 | 77 | 70 | 62 | 10.0 |
| 87 | 850 | 2 | 1 | 884 | 72 | 70 | 62 | 7.0 |
| 88 | 1290 | 2 | 2 | 1210 | 80 | 72 | 60 | 10.0 |
| 89 | 1115 | 2 | 1 | 1107 | 78 | 72 | 62 | 12.0 |
| 90 | 1050 | 2 | 1 | 1100 | 81 | 72 | 63 | 5.0 |
| 91 | 1110 | 2 | 1 | 1154 | 80 | 72 | 60 | 3.6 |
| 92 | 900 | 2 | 5 | 1079 | 79 | 72 | 58 | 1.0 |
| 93 | 1050 | 2 | 2 | 1015 | 80 | 72 | 63 | 5.0 |
| 94 | 950 | 2 | 2 | 1035 | 77 | 72 | 63 | 13.0 |
| 95 | 1000 | 2 | 1 | 1003 | 76 | 72 | 63 | 7.0 |
| 96 | 1200 | 2 | 1 | 1023 | 77 | 72 | 65 | 15.0 |
| 97 | 1250 | 3 | 5 | 1344 | 82 | 73 | 67 | 2.0 |
| 98 | 1300 | 2 | 1 | 1143 | 79 | 73 | 59 | 18.0 |
| 99 | 1200 | 2 | 1 | 1117 | 80 | 73 | 62 | 2.0 |
| 100 | 1200 | 2 | 2 | 1126 | 80 | 73 | 61 | 12.0 |
| 101 | 1350 | 2 | 1 | 1116 | 77 | 73 | 65 | 9.0 |
| 102 | 1215 | 2 | 1 | 1171 | 81 | 73 | 64 | 3.0 |
| 103 | 1200 | 2 | 2 | 1130 | 80 | 73 | 64 | 7.0 |
| 104 | 1250 | 2 | 1 | 1204 | 81 | 73 | 64 | 3.0 |
| 105 | 1200 | 2 | 1 | 1165 | 78 | 73 | 64 | 9.0 |
| 106 | 1000 | 2 | 1 | 1175 | 77 | 73 | 63 | 19.0 |
| 107 | 1100 | 2 | 1 | 1075 | 74 | 73 | 64 | 10.0 |
| 109 | 1310 | 3 | 2 | 1306 | 84 | 74 | 66 | 1.0 |
| 110 | 1150 | 2 | 2 | 1109 | 78 | 74 | 59 | 3.0 |
| 111 | 1225 | 2 | 2 | 1225 | 82 | 74 | 61 | 15.0 |
| 112 | 1300 | 2 | 1 | 1220 | 82 | 74 | 64 | 17.0 |
| 113 | 1100 | 2 | 2 | 1196 | 81 | 74 | 59 | 5.0 |
| 114 | 1250 | 2 | 1 | 1190 | 80 | 74 | 63 | 3.0 |
| 115 | 1275 | 2 | 1 | 1182 | 83 | 74 | 65 | 7.0 |
| 116 | 1250 | 2 | 2 | 1310 | 84 | 74 | 62 | 15.0 |
| 117 | 1200 | 2 | 1 | 1280 | 85 | 74 | 66 | 14.0 |
| 118 | 1250 | 2 | 1 | 1300 | 82 | 74 | 65 | 14.0 |
| 119 | 1300 | 2 | 1 | 1253 | 84 | 74 | 66 | 25.0 |
| 120 | 1100 | 2 | 2 | 1105 | 80 | 74 | 64 | 5.0 |
| 122 | 1275 | 2 | 2 | 1187 | 80 | 75 | 64 | 6.0 |
| 123 | 1280 | 2 | 1 | 1290 | 86 | 75 | 65 | 7.0 |
| 124 | 1300 | 2 | 2 | 1215 | 79 | 75 | 61 | 7.0 |
| 125 | 1250 | 2 | 1 | 1203 | 80 | 75 | 63 | 5.0 |
| 126 | 1250 | 2 | 1 | 1250 | 79 | 75 | 65 | 9.0 |
| 127 | 1170 | 2 | 1 | 1177 | 79 | 75 | 65 | 22.0 |
| 128 | 1250 | 2 | 1 | 1188 | 80 | 75 | 65 | 10.0 |
| 129 | 1280 | 2 | 1 | 1315 | 81 | 78 | 67 | 10.0 |
| 130 | 700 | 3 | 4 | 745 | 67 | 63 | 58 | 0.5 |
| 132 | 1100 | 2 | 1 | 1125 | 77 | 71 | 61 | 4.0 |
| 133 | 1150 | 2 | 1 | 1120 | 83 | 71 | 63 | 5.0 |
| 134 | 1075 | 2 | 1 | 1170 | 82 | 71 | 62 | 10.0 |
| 135 | 1150 | 2 | 1 | 1055 | 74 | 71 | 62 | 5.0 |
| 136 | 1325 | 2 | 1 | 1292 | 84 | 77 | 65 | 19.0 |

-continued

Equine Weight Estimation Research Database

| ID | ESTWT | BREED | GENDER | ACTWT | LENGTH | GIRTH | HEIGHT | AGE |
|---|---|---|---|---|---|---|---|---|
| 137 | 600 | 3 | 2 | 655 | 63 | 59 | 58 | 0.4 |
| 138 | 1275 | 2 | 1 | 1170 | 78 | 76 | 62 | 3.0 |
| 139 | 1175 | 2 | 2 | 1190 | 80 | 76 | 62 | 4.0 |
| 140 | 1550 | 3 | 2 | 1280 | 86 | 76 | 67 | 2.0 |
| 141 | 2225 | 3 | 1 | 1952 | 96 | 85 | 70 | 7.0 |
| 142 | 1750 | 3 | 2 | 2175 | 96 | 91 | 70 | 6.0 |
| 143 | 1500 | 3 | 2 | 1626 | 92 | 82 | 68 | 5.0 |
| 144 | 1500 | 3 | 1 | 1530 | 85 | 83 | 65 | 19.0 |
| 145 | 1400 | 3 | 1 | 1460 | 87 | 81 | 67 | 19.0 |
| 146 | 1775 | 3 | 1 | 1850 | 91 | 92 | 75 | 12.0 |
| 147 | 1875 | 3 | 1 | 1900 | 92 | 92 | 75 | 5.0 |
| 148 | 1925 | 3 | 1 | 2200 | 93 | 91 | 75 | 6.0 |
| 149 | 2000 | 3 | 1 | 2100 | 93 | 87 | 76 | 6.0 |
| 150 | 1765 | 3 | 1 | 1745 | 91 | 88 | 75 | 9.0 |
| 151 | 1775 | 3 | 1 | 1732 | 90 | 83 | 73 | 8.0 |
| 152 | 1700 | 3 | 1 | 1674 | 88 | 85 | 72 | 8.0 |
| 153 | 1600 | 3 | 1 | 1595 | 89 | 84 | 68 | 8.0 |
| 154 | 1650 | 3 | 1 | 1659 | 84 | 85 | 72 | 5.0 |
| 155 | 1700 | 3 | 1 | 1682 | 92 | 84 | 71 | 12.0 |
| 156 | 755 | 2 | 2 | 803 | 71 | 67 | 52 | 17.0 |
| 157 | 1000 | 2 | 2 | 981 | 76 | 70 | 57 | 11.0 |
| 158 | 1100 | 2 | 1 | 1040 | 78 | 70 | 59 | 5.0 |
| 159 | 950 | 2 | 2 | 1013 | 82 | 70 | 58 | 8.0 |
| 160 | 900 | 2 | 4 | 990 | 72 | 70 | 56 | 1.0 |
| 161 | 1175 | 2 | 2 | 1035 | 78 | 70 | 57 | 13.0 |
| 162 | 1150 | 2 | 1 | 1204 | 81 | 74 | 63 | 17.0 |
| 163 | 1275 | 2 | 1 | 1180 | 80 | 74 | 64 | 8.0 |
| 164 | 1225 | 2 | 1 | 1225 | 80 | 74 | 62 | 6.0 |
| 165 | 1245 | 2 | 1 | 1230 | 83 | 74 | 63 | 4.0 |
| 166 | 1200 | 2 | 4 | 1283 | 81 | 74 | 63 | 2.0 |
| 167 | 1200 | 2 | 2 | 1180 | 81 | 74 | 61 | 7.0 |
| 168 | 1200 | 2 | 2 | 1105 | 78 | 74 | 60 | 10.0 |
| 169 | 1175 | 2 | 1 | 1140 | 77 | 74 | 63 | 4.0 |
| 170 | 1000 | 2 | 2 | 930 | 75 | 68 | 55 | 6.0 |
| 171 | 950 | 2 | 1 | 1013 | 76 | 68 | 59 | 3.0 |
| 172 | 950 | 2 | 5 | 1030 | 77 | 68 | 61 | 1.0 |
| 173 | 1000 | 2 | 2 | 920 | 76 | 68 | 58 | 18.0 |
| 174 | 965 | 2 | 2 | 980 | 75 | 69 | 57 | 7.0 |
| 175 | 975 | 2 | 5 | 1030 | 77 | 69 | 57 | 6.0 |
| 176 | 1200 | 2 | 1 | 1240 | 80 | 75 | 63 | 4.0 |
| 177 | 1075 | 2 | 1 | 1182 | 81 | 75 | 65 | 6.0 |
| 178 | 1150 | 2 | 1 | 1162 | 79 | 75 | 62 | 10.0 |
| 179 | 1350 | 2 | 1 | 1282 | 81 | 75 | 62 | 7.0 |
| 180 | 1230 | 2 | 1 | 1255 | 82 | 75 | 63 | 8.0 |
| 181 | 1050 | 2 | 2 | 1210 | 80 | 75 | 62 | 11.0 |
| 182 | 1275 | 2 | 1 | 1386 | 84 | 76 | 62 | 11.0 |
| 183 | 1275 | 2 | 2 | 1230 | 83 | 76 | 61 | 6.0 |
| 184 | 1280 | 2 | 1 | 1246 | 81 | 76 | 62 | 17.0 |
| 185 | 1100 | 2 | 1 | 1208 | 80 | 76 | 60 | 4.0 |
| 186 | 1250 | 2 | 2 | 1206 | 82 | 76 | 63 | 17.0 |
| 187 | 1200 | 2 | 1 | 1280 | 84 | 76 | 64 | 5.0 |
| 188 | 1175 | 2 | 1 | 1250 | 79 | 77 | 64 | 11.0 |
| 189 | 1225 | 2 | 2 | 1327 | 83 | 77 | 63 | 11.0 |
| 190 | 1000 | 2 | 5 | 1165 | 78 | 77 | 61 | 1.0 |
| 191 | 1305 | 2 | 2 | 1060 | 78 | 71 | 57 | 7.0 |
| 192 | 1090 | 2 | 1 | 1045 | 77 | 71 | 58 | 1.0 |
| 193 | 975 | 2 | 1 | 1072 | 78 | 71 | 61 | 7.0 |
| 194 | 1275 | 2 | 1 | 1137 | 81 | 71 | 65 | 15.0 |
| 195 | 1100 | 2 | 2 | 1075 | 80 | 71 | 60 | 10.0 |
| 196 | 1180 | 2 | 1 | 1157 | 79 | 72 | 61 | 16.0 |
| 197 | 1100 | 2 | 1 | 1194 | 80 | 72 | 60 | 9.0 |
| 198 | 1180 | 2 | 2 | 1160 | 81 | 72 | 59 | 5.0 |
| 199 | 1100 | 2 | 1 | 1165 | 79 | 72 | 60 | 4.0 |
| 200 | 1150 | 2 | 1 | 1198 | 83 | 72 | 63 | 13.0 |
| 201 | 1050 | 2 | 1 | 1209 | 82 | 72 | 60 | 11.0 |
| 202 | 1100 | 2 | 1 | 1131 | 80 | 72 | 64 | 21.0 |
| 203 | 950 | 2 | 1 | 1130 | 79 | 72 | 61 | 11.0 |
| 204 | 1150 | 2 | 2 | 1090 | 77 | 72 | 59 | 1.5 |
| 205 | 1100 | 2 | 1 | 995 | 78 | 72 | 62 | 16.0 |
| 206 | 1240 | 2 | 2 | 1225 | 83 | 73 | 60 | 11.0 |
| 207 | 1300 | 2 | 1 | 1295 | 83 | 73 | 62 | 8.0 |
| 208 | 1000 | 2 | 1 | 1036 | 75 | 73 | 57 | 22.0 |
| 209 | 1275 | 2 | 1 | 1200 | 83 | 73 | 62 | 4.0 |
| 210 | 1350 | 2 | 1 | 1220 | 82 | 73 | 64 | 5.0 |
| 211 | 1075 | 2 | 1 | 1190 | 82 | 73 | 63 | 9.0 |

| | | -continued | | | | | | |
|---|---|---|---|---|---|---|---|---|
| | | Equine Weight Estimation Research Database | | | | | | |
| ID | ESTWT | BREED | GENDER | ACTWT | LENGTH | GIRTH | HEIGHT | AGE |
| 212 | 1175 | 2 | 1 | 1130 | 78 | 73 | 63 | 9.0 |
| 213 | 1350 | 2 | 1 | 1393 | 89 | 78 | 63 | 9.0 |
| 214 | 1400 | 2 | 1 | 1660 | 88 | 83 | 67 | 3.0 |
| 215 | 1325 | 2 | 4 | 1490 | 86 | 82 | 65 | 3.0 |
| 216 | 375 | 2 | 4 | 618 | 65 | 59 | 52 | 0.8 |
| 217 | 700 | 2 | 2 | 730 | 70 | 63 | 52 | 7.0 |
| 218 | 750 | 2 | 2 | 696 | 69 | 63 | 51 | 19.0 |
| 219 | 960 | 2 | 2 | 826 | 70 | 66 | 54 | 15.0 |
| 220 | 850 | 2 | 2 | 740 | 68 | 66 | 52 | 15.0 |
| 221 | 985 | 2 | 1 | 921 | 74 | 66 | 57 | 7.0 |
| 222 | 800 | 2 | 5 | 828 | 69 | 65 | 53 | 4.0 |
| 223 | 2 | 2 | 5 | 682 | 66 | 60 | 53 | 0.6 |
| 224 | 250 | 2 | 5 | 303 | 49 | 45 | 43 | 0.3 |

The software program 70 and/or the weight estimation logic 74 can be implemented in any suitable programming language or format. For example, Visual Basic 6.0, or C++ can be utilized to implement the software program 70 and/or the weight estimation logic 74. Set forth hereinafter is one embodiment of the software program 70, which was written in Visual Basic 6.0.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

```
Main - 1
Private Sub Command1_Click()
  If Text1.Text > "1" And Text2.Text > "1" And Text3.Text > "1" Then
    Text4.Text = CInt(0.003584 * (Text1.Text ^ 1.630634) * (Text2.Text ^ 0.954088) * (Text3.Tex
^ 0.39986))
  End If
End Sub
Private Sub mnuAbout_Click()
  Dim f As New About
  f.Show
End Sub
Private Sub mnuExit_Click()
  Unload Me End Sub
Private Sub mnuHelpGirth_Click()
  Dim f As New Girth
  f.Show
End Sub
Private Sub mnuHelpHeight_Click()
  Dim f As New Height
  f.Show
End Sub
Private Sub mnuHelpLength_Click()
  Dim f As New Length
  f.Show
End Sub
Private Sub mnuReset_Click()
  Text1.Text = ""
  Text2.Text = ""
  Text3.Text = ""
  Text4.Text = ""
End Sub
```

```
Main - 1

VERSION 5.00
Object = "{6B7E6392-850A-101B-AFC0-4210102A8DA7}#1.3#0"; "COMCTL32.OCX"
Begin VB.Form Main
   Caption         =   "Equi-Calc"
   ClientHeight    =   5130
   ClientLeft      =   165
   ClientTop       =   450
   ClientWidth     =   7800
   LinkTopic       =   "Main"
   MaxButton       =   0   'False
   MinButton       =   0   'False
   ScaleHeight     =   5130
   ScaleWidth      =   7800
   StartUpPosition =   2   'CenterScreen
   Begin VB.PictureBox Picture1
      Appearance      =   0   'Flat
      AutoSize        =   -1  'True
      BackColor       =   &H80000005&
      ForeColor       =   &H80000008&
      Height          =   675
      Left            =   5520
      Picture         =   (Bitmap)
      ScaleHeight     =   645
      ScaleWidth      =   1785
      TabIndex        =   9
      Top             =   2760
      Width           =   1815
   End
   Begin ComctlLib.StatusBar StatusBar1
      Align           =   2   'Align Bottom
      Height          =   375
      Left            =   0
      TabIndex        =   8
      Top             =   4755
      Width           =   7800
      _ExtentX        =   13758
      _ExtentY        =   661
      SimpleText      =   ""
      _Version        =   327682
      BeginProperty Panels {0713E89E-850A-101B-AFC0-4210102A8DA7}
         NumPanels       =   3
         BeginProperty Panel1 {0713E89F-850A-101B-AFC0-4210102A8DA7}
            Object.Width    =   6174
            MinWidth        =   6174
            Picture         =   (Binary)
            TextSave        =   ""
            Key             =   ""
            Object.Tag      =   ""
         EndProperty
         BeginProperty Panel2 {0713E89F-850A-101B-AFC0-4210102A8DA7}
            Style           =   5
            Object.Width    =   1764
            MinWidth        =   1764
            TextSave        =   "7:38 AM"
            Key             =   ""
            Object.Tag      =   ""
         EndProperty
         BeginProperty Panel3 {0713E89F-850A-101B-AFC0-4210102A8DA7}
            Style           =   6
            Object.Width    =   1764
            MinWidth        =   1764
            TextSave        =   "3/12/01"
            Key             =   ""
            Object.Tag      =   ""
         EndProperty
      EndProperty
      BeginProperty Font {0BE35203-8F91-11CE-9DE3-00AA004BB851}
         Name            =   "MS Sans Serif"
```

```
Main - 2
    .      Size           =    8.25
           Charset        =    0
           Weight         =    400
    .      Underline      =    0      'False
           Italic         =    0      'False
           Strikethrough  =    0      'False
        EndProperty
End
Begin VB.CommandButton Command1
     Caption        =   "Calculate"
     Height         =   375
     Left           =   3840
     TabIndex       =   4
     Top            =   3120
     Width          =   1095
End
Begin VB.TextBox Text4
     Appearance     =   0      'Flat
     BeginProperty DataFormat
        Type           =   1
        Format         =   "#,##0"
        HaveTrueFalseNull=  0
        FirstDayOfWeek =   0
        FirstWeekOfYear =  0
        LCID           =   1033
        SubFormatType  =   1
     EndProperty
     Enabled        =   0      'False
     BeginProperty Font
        Name           =   "MS Sans Serif"
        Size           =   12
        Charset        =   0
        Weight         =   700
        Underline      =   0      'False
        Italic         =   0      'False
        Strikethrough  =   0      'False
     EndProperty
     Height         =   375
     Left           =   3840
     TabIndex       =   3
     Top            =   3720
     Width          =   1095
End
Begin VB.TextBox Text3
     BeginProperty Font
        Name           =   "MS Sans Serif"
        Size           =   12
        Charset        =   0
        Weight         =   700
        Underline      =   0      'False
        Italic         =   0      'False
        Strikethrough  =   0      'False
     EndProperty
     Height         =   375
     Left           =   3840
     TabIndex       =   2
     Top            =   2520
     Width          =   1095
End
Begin VB.TextBox Text2
     BeginProperty Font
        Name           =   "MS Sans Serif"
        Size           =   12
        Charset        =   0
        Weight         =   700
        Underline      =   0      'False
        Italic         =   0      'False
        Strikethrough  =   0      'False
```

```
Main - 3

EndProperty
          Height          =   375
          Left            =   3840
          TabIndex        =   1
          Top             =   1680
          Width           =   1095
       End
       Begin VB.TextBox Text1
          BeginProperty Font
             Name            =   "MS Sans Serif"
             Size            =   12
             Charset         =   0
             Weight          =   700
             Underline       =   0   'False
             Italic          =   0   'False
             Strikethrough   =   0   'False
          EndProperty
          Height          =   375
          Left            =   3840
          TabIndex        =   0
          Top             =   840
          Width           =   1095
       End
       Begin VB.Image Image1
          Height          =   1050
          Left            =   5640
          Picture         =   (Bitmap)
          Stretch         =   -1  'True
          Top             =   1440
          Width           =   1500
       End
       Begin VB.Label Label1
          Alignment       =   1   'Right Justify
          Caption         =   "Heart Girth in Inches"
          BeginProperty Font
             Name            =   "MS Sans Serif"
             Size            =   12
             Charset         =   0
             Weight          =   700
             Underline       =   0   'False
             Italic          =   0   'False
             Strikethrough   =   0   'False
          EndProperty
          Height          =   495
          Left            =   840
          TabIndex        =   10
          Top             =   840
          Width           =   2655
       End
       Begin VB.Label Label4
          Alignment       =   1   'Right Justify
          Caption         =   "Equi-Calc Weight Estimate ="
          BeginProperty Font
             Name            =   "MS Sans Serif"
             Size            =   12
             Charset         =   0
             Weight          =   700
             Underline       =   0   'False
             Italic          =   0   'False
             Strikethrough   =   0   'False
          EndProperty
          Height          =   495
          Left            =   240
          TabIndex        =   7
          Top             =   3720
          Width           =   3495
       End
       Begin VB.Label Label3
```

```
Main - 4
       Alignment       =   1   'Right Justify
       Caption         =   "Length in Inches"
       BeginProperty Font
           Name        =   "MS Sans Serif"
           Size        =   12
           Charset     =   0
           Weight      =   700
           Underline   =   0   'False
           Italic      =   0   'False
           Strikethrough = 0   'False
       EndProperty
       Height          =   495
       Left            =   720
       TabIndex        =   6
       Top             =   2520
       Width           =   2775
    End
    Begin VB.Label Label2
       Alignment       =   1   'Right Justify
       Caption         =   "Height in Inches"
       BeginProperty Font
           Name        =   "MS Sans Serif"
           Size        =   12
           Charset     =   0
           Weight      =   700
           Underline   =   0   'False
           Italic      =   0   'False
           Strikethrough = 0   'False
       EndProperty
       Height          =   495
       Left            =   720
       TabIndex        =   5
       Top             =   1680
       Width           =   2775
    End
    Begin VB.Menu mnuHelp
       Caption         =   "Help"
       Begin VB.Menu mnuHelpGirth
           Caption     =   "Girth"
       End
       Begin VB.Menu mnuHelpHeight
           Caption     =   "Height"
       End
       Begin VB.Menu mnuHelpLength
           Caption     =   "Length"
       End
    End
    Begin VB.Menu mnuAbout
       Caption         =   "About"
    End
    Begin VB.Menu mnuReset
       Caption         =   "Reset/Clear Calculation"
    End
    Begin VB.Menu mnuExit
       Caption         =   "Exit"
    End
End
```

```
Girth - 1

Private Sub mnuExit_Click()
  Unload Me
End Sub
```

Girth - 1

```
VERSION 5.00
Begin VB.Form Girth
    Caption         =   "Girth Measurement Help Screen"
    ClientHeight    =   5130
    ClientLeft      =   165
    ClientTop       =   450
    ClientWidth     =   7800
    LinkTopic       =   "Form2"
    MaxButton       =   0   'False
    MinButton       =   0   'False
    ScaleHeight     =   5130
    ScaleWidth      =   7800
    StartUpPosition =   2   'CenterScreen
    Begin VB.Label Label1
        Caption     =   <...>
        Height      =   2055
        Left        =   5040
        TabIndex    =   0
        Top         =   1680
        Width       =   2535
        WordWrap    =   -1  'True
    End
    Begin VB.Image Image1
        Height      =   4980
        Left        =   120
        Picture     =   (Bitmap)
        Stretch     =   -1  'True
        Top         =   0
        Width       =   4680
    End
    Begin VB.Menu mnuExit
        Caption     =   "Exit"
    End
End
```

```
Height - 1

Private Sub mnuExit_Click()
  Unload Me
End Sub
```

```
Height - 1

VERSION 5.00
Begin VB.Form Height
   Caption         =   "Height Measurement Help Screen"
   ClientHeight    =   5130
   ClientLeft      =   165
   ClientTop       =   450
   ClientWidth     =   7800
   LinkTopic       =   "Form1"
   MaxButton       =   0   'False
   MinButton       =   0   'False
   ScaleHeight     =   5130
   ScaleWidth      =   7800
   StartUpPosition =   2   'CenterScreen
   Begin VB.Label Label1
      Caption      =   "The height measurement is obtained by taking the distance in inches
      Height       =   1455
      Left         =   4920
      TabIndex     =   0
      Top          =   2160
      Width        =   2655
      WordWrap     =   -1  'True
   End
   Begin VB.Image Image1
      Height       =   4980
      Left         =   120
      Picture      =   (Bitmap)
      Stretch      =   -1  'True
      Top          =   0
      Width        =   4680
   End
   Begin VB.Menu mnuExit
      Caption      =   "Exit"
   End
End
```

Length - 1

```
Private Sub mnuExit_Click()
  Unload Me
End Sub
```

```
Length - 1
VERSION 5.00
Begin VB.Form Length
   Caption         =   "Length Measurement Help Screen"
   ClientHeight    =   5130
   ClientLeft      =   165
   ClientTop       =   450
   ClientWidth     =   7800
   LinkTopic       =   "Form1"
   MaxButton       =   0   'False
   MinButton       =   0   'False
   ScaleHeight     =   5130
   ScaleWidth      =   7800
   StartUpPosition =   2   'CenterScreen
   Begin VB.Label Label1
      Caption      =   <...>
      Height       =   1695
      Left         =   4920
      TabIndex     =   0
      Top          =   2040
      Width        =   2655
      WordWrap     =   -1  'True
   End
   Begin VB.Image Image1
      Height       =   4980
      Left         =   120
      Picture      =   (Bitmap)
      Stretch      =   -1  'True
      Top          =   0
      Width        =   4680
   End
   Begin VB.Menu mnuExit
      Caption      =   "Exit"
   End
End
```

About - 1

```
Private Sub mnuExit_Click()
  Unload Me
End Sub
```

```
About - 1

VERSION 5.00
Begin VB.Form About
    Caption         =   "About"
    ClientHeight    =   5130
    ClientLeft      =   165
    ClientTop       =   450
    ClientWidth     =   7800
    LinkTopic       =   "Form1"
    MaxButton       =   0   'False
    MinButton       =   0   'False
    ScaleHeight     =   19727.89
    ScaleLeft       =   105
    ScaleMode       =   0   'User
    ScaleTop        =   105
    ScaleWidth      =   25790.77
    StartUpPosition =   2   'CenterScreen
    Begin VB.Label Label1
        Caption         =   <...>
        BeginProperty Font
            Name            =   "MS Sans Serif"
            Size            =   12
            Charset         =   0
            Weight          =   400
            Underline       =   0   'False
            Italic          =   0   'False
            Strikethrough   =   0   'False
        EndProperty
        Height          =   2415
        Left            =   2160
        TabIndex        =   0
        Top             =   360
        Width           =   5295
        WordWrap        =   -1  'True
    End
    Begin VB.Image Image1
        Height          =   615
        Left            =   240
        Picture         =   (Bitmap)
        Stretch         =   -1  'True
        Top             =   120
        Width           =   1815
    End
    Begin VB.Menu mnuExit
        Caption         =   "Exit"
    End
End
```

What is claimed is:

1. A method for estimating the weight of a horse, comprising the steps of:
   a. measuring a girth, a length and a height of the horse; and
   b. determining an estimated weight of the horse in accordance with the following mathematical formula $$\text{Weight Estimate} = k1 \times \text{Girth}^{x1} \times \text{Height}^{x2} \times \text{Length}^{x3}$$

wherein k1 is about 0.0036, x1 is about 1.6, x2 is about 0.95 and x3 is about 0.40, when the girth, length and height are measured in inches.

2. A method for estimating the weight of a horse, comprising the steps of:
   a. measuring a girth, a length and a height of the horse; and
   b. determining an estimated weight of the horse in accordance with the following mathematical formula $$\text{Weight Estimate} = k2 \times (\text{Girth} \times f1 + \text{Height} \times f2 \times \text{Length} \times f3)^{x4}$$

wherein k2 is about 0.0036, f1 is about 0.56, f2 is about 0.31, f3 is about 0.13 and x4 is about 2.98, when the girth, length and height are measured in inches.

3. A method for estimating the weight of a horse, comprising the steps of:
   a. receiving a measured girth of the horse;
   b. receiving a measured height of the horse;
   c. receiving a measured length of the horse;
   d. determining an estimated weight of the horse in accordance with the following mathematical formula $$\text{Weight Estimate} = k1 \times \text{Girth}^{x1} \times \text{Height}^{x2} \times \text{Length}^{x3}$$

wherein k1 is about 0.0036, x1 is about 1.6, x2 is about 0.95 and x3 is about 0.40, when the girth, height and length are measured in inches; and
   e. outputting the estimated weight of the horse.

4. A method for estimating the weight of a horse, comprising the steps of:
   a. receiving a measured girth of the horse;
   b. receiving a measured height of the horse;
   c. receiving a measured length of the horse;
   d. determining an estimated weight of the horse in accordance with the following mathematical formula $$\text{Weight Estimate} = k2 \times (\text{Girth} \times f1 + \text{Height} \times f2 \times \text{Length} \times f3)^{x4}$$

wherein k2 is about 0.0036, f1 is about 0.56, f2 is about 0.31, f3 is about 0.13 and x4 is about 2.98, when the girth, height and length are measured in inches; and
   e. outputting the estimated weight of the horse.

5. An apparatus for estimating the weight of a horse, comprising:
   an input unit adapted to receive a measured height, a measured girth and a measured length of the horse;
   a storage unit storing weight estimation logic adapted to estimate the weight of the horse in accordance with the following mathematical formula $$\text{Weight Estimate} = k1 \times \text{Girth}^{x1} \times \text{Height}^{x2} \times \text{Length}^{x3}$$

wherein k1 is about 0.0036, x1 is about 1.6, x2 is about 0.95 and x3 is about 0.40, when the girth, height and length are measured in inches; and
   a computer unit receiving the measured height, the measured girth and the measured length of the horse and executing the weight estimation logic to determine an estimated weight of the horse based on the measured girth, the measured length and the measured height of the horse; and
   an output unit outputting, in a format perceivable by an individual, the estimated weight of the horse.

6. An apparatus for estimating the weight of a horse, comprising:
   an input unit adapted to receive a measured height, a measured girth and a measured length of the horse;
   a storage unit storing weight estimation logic adapted to estimate the weight of the horse in accordance with the following mathematical formula $$\text{Weight Estimate} = k2 \times (\text{Girth} \times f1 + \text{Height} \times f2 \times \text{Length} \times f3)^{x4}$$

wherein k2 is about 0.0036, f1 is about 0.56, f2 is about 0.31, f3 is about 0.13 and x4 is about 2.98, when the girth, height and length are measured in inches; and
   a computer unit receiving the measured height, the measured girth and the measured length of the horse and executing the weight estimation logic to determine an estimated weight of the horse based on the measured girth, the measured length and the measured height of the horse; and
   an output unit outputting, in a format perceivable by an individual, the estimated weight of the horse.

7. A software program capable of running on a computer for estimating the weight of a horse, comprising:
   a storage unit storing:
      input logic adapted to receive a measured height, a measured girth and a measured length of the horse;
      weight estimation logic for determining an estimated weight of the horse in accordance with the following mathematical formula $$\text{Weight Estimate} = k1 \times \text{Girth}^{x1} \times \text{Height}^{x2} \times \text{Length}^{x3}$$

wherein k1 is about 0.0036, x1 is about 1.6, x2 is about 0.95 and x3 is about 0.40, when the girth, height and length are measured in inches; and
      output logic for receiving the estimated weight of the horse and outputting the estimated weight of the horse.

8. A software program capable of running on a computer for estimating the weight of a horse, comprising:
   a storage unit storing:
      input logic adapted to receive a measured height, a measured girth and a measured length of the horse;
      weight estimation logic for determining an estimated weight of the horse in accordance with the following mathematical formula $$\text{Weight Estimate} = k2 \times (\text{Girth} \times f1 + \text{Height} \times f2 \times \text{Length} \times f3)^{x4}$$

wherein k2 is about 0.0036, f1 is about 0.56, f2 is about 0.31, f3 is about 0.13 and x4 is about 2.98, when the girth, height and length are measured in inches; and
      output logic for receiving the estimated weight of the horse and outputting the estimated weight of the horse.

9. A method for estimating the weight of a horse, comprising the steps of:

a. measuring a girth and a height of the horse; and b. determining an estimated weight of the horse in accordance with the following mathematical formula $$\text{Estimated Weight} = k3 \times \text{Girth}^{x5} \times \text{Height}^{x6}$$

wherein k3 is about 0.0035, x5 is about 1.99, and x6 is about 1.0, when the girth and height are measured in inches.

10. A method for estimating the weight of a horse, comprising the steps of:

a. measuring a girth and a height of the horse; and b. determining an estimated weight of the horse in accordance with the following mathematical formula $$\text{Estimated Weight} = k4 \times (\text{Girth} \times f4 + \text{Height} \times f5)^{x7}$$

wherein k4 is about 0.0035, f4 is about 0.63, f5 is about 0.37 and x7 is about 3.0, when the girth and height are measured in inches.

11. A method for estimating the weight of a horse, comprising the steps of:

a. receiving a measured girth of the horse;

b. receiving a measured height of the horse;

c. determining an estimated weight of the horse in accordance with the following mathematical formula $$\text{Estimated Weight} = k3 \times \text{Girth}^{x5} \times \text{Height}^{x6}$$

wherein k3 is about 0.0035, x5 is about 1.99, and x6 is about 1.0, when the girth and height are measured in inches; and d. outputting the estimated weight of the horse.

12. A method for estimating the weight of a horse, comprising the steps of:

a. receiving a measured girth of the horse;

b. receiving a measured height of the horse;

c. determining an estimated weight of the horse in accordance with the following mathematical formula $$\text{Estimated Weight} = k4 \times (\text{Girth} \times f4 + \text{Height} \times f5)^{x7}$$

wherein k4 is about 0.0035, f4 is about 0.63, f5 is about 0.37 and x7 is about 3.0, when the girth and height are measured in inches.

13. An apparatus for estimating the weight of a horse, comprising:

an input unit adapted to receive a measured girth and a measured height of the horse;

a storage unit storing weight estimation logic adapted to estimate the weight of the horse in accordance with the following mathematical formula $$\text{Estimated Weight} = k3 \times \text{Girth}^{x5 \times \text{Height} x6}$$

wherein k3 is about 0.0035, x5 is about 1.99, and x6 is about 1.0, when the girth and height are measured in inches; and a computer unit receiving the measured height, and the measured girth of the horse and executing the weight estimation logic to determine an estimated weight of the horse based on the measured girth, and the measured height of the horse; and an output unit outputting the estimated weight of the horse.

14. An apparatus for estimating the weight of a horse, comprising:

an input unit adapted to receive a measured girth and a measured height of the horse;

a storage unit storing weight estimation logic adapted to estimate the weight of the horse in accordance with the following mathematical formula $$\text{Estimated Weight} = k4 \times (\text{Girth} \times f4 + \text{Height} \times f5)^{x7}$$

wherein k4 is about 0.0035, f4 is about 0.63, f5 is about 0.37 and x7 is about 3.0, when the girth and height are measured in inches.

15. A software program capable of running on a computer for estimating the weight of a horse, comprising:

a storage unit storing:

input logic adapted to receive a measured height, and a measured girth of the horse;

weight estimation logic for determining an estimated weight of the horse in accordance with the following mathematical formula $$\text{Estimated Weight} = k3 \times \text{Girth}^{x5} \times \text{Height}^{x6}$$

wherein k3 is about 0.0035, x5 is about 1.99, and x6 is about 1.0, when the girth and height are measured in inches; and output logic for outputting the estimated weight of the horse.

16. A software program capable of running on a computer for estimating the weight of a horse, comprising:

a storage unit storing;

input logic adapted to receive a measured height, and a measured girth of the horse;

weight estimation logic for determining an estimated weight of the horse in accordance with the following mathematical formula $$\text{Estimated Weight} = k4 \times (\text{Girth} \times f4 + \text{Height} \times f5)^{x7}$$

wherein k4 is about 0.0035, f4 is about 0.63, f5 is about 0.37 and x7 is about 3.0, when the girth and height are measured in inches.

* * * * *